(12) United States Patent
Buehner et al.

(10) Patent No.: US 11,946,914 B2
(45) Date of Patent: Apr. 2, 2024

(54) METHOD FOR PROVIDING A CASING FOR A CHROMATOGRAPHY COLUMN AND CHROMATOGRAPHY COLUMN

(71) Applicant: Merck Patent GmbH, Darmstadt (DE)

(72) Inventors: Pedro Buehner, Dieburg (DE); Philipp Knoth, Plankstadt (DE); Benjamin Peters, Muenster (DE); Michael Ukelis, Riedstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 445 days.

(21) Appl. No.: 17/415,091

(22) PCT Filed: Dec. 17, 2019

(86) PCT No.: PCT/EP2019/085632
§ 371 (c)(1),
(2) Date: Jun. 17, 2021

(87) PCT Pub. No.: WO2020/127252
PCT Pub. Date: Jun. 25, 2020

(65) Prior Publication Data
US 2022/0062789 A1 Mar. 3, 2022

(30) Foreign Application Priority Data
Dec. 20, 2018 (EP) .................................. 18214664

(51) Int. Cl.
*G01N 30/60* (2006.01)
*B01D 15/22* (2006.01)
(Continued)

(52) U.S. Cl.
CPC ......... *G01N 30/6052* (2013.01); *B01D 15/22* (2013.01); *B22F 10/25* (2021.01);
(Continued)

(58) Field of Classification Search
CPC .. B22F 5/106; B22F 7/08; B22F 10/18; B22F 10/22; B22F 10/25; B22F 10/28;
(Continued)

(56) References Cited

U.S. PATENT DOCUMENTS 11,268,938 B2 3/2022 Cabrera et al.
2018/0126298 A1 5/2018 Cabrera et al.

FOREIGN PATENT DOCUMENTS

DE 102017127316 A1 3/2018
JP 2018535420 A 11/2018

OTHER PUBLICATIONS

Steffen Nowotny et al: "Laser Beam Build-Up Welding: Precision in Repair, Surface Cladding, and Direct 3D Metal Deposition", Journal of Thermal Spray Technology., vol. 16, No. 3, Apr. 24, 2007 (Apr. 24, 2007), US, pp. 344-348, XP055584862, ISSN: 1059-9630, DOI: 10.1007/s11666-007-9028-5.

(Continued)

*Primary Examiner* — Moshe Wilensky
(74) *Attorney, Agent, or Firm* — Millen, White, Zelano & Branigan, P.C.; Ryan R. Pool

(57) ABSTRACT

A method for providing a casing (11) for a prefabricated column (1) of chromatography column material in order to manufacture a chromatography column, wherein the casing (11) is generated by additive manufacturing, includes the steps of rotating the column (1) of chromatography column material with respect to a casing material feed in a manner to successively cover a casing surface (8) of the chromatography column material along a contact area path (12), and of arranging an amount of flowable casing material (9) at a current contact area (7) along the contact area path (12) at the casing surface (8) of the column (1) of chromatography column material in order to generate the casing (11) for the (Continued)

Figure 1:
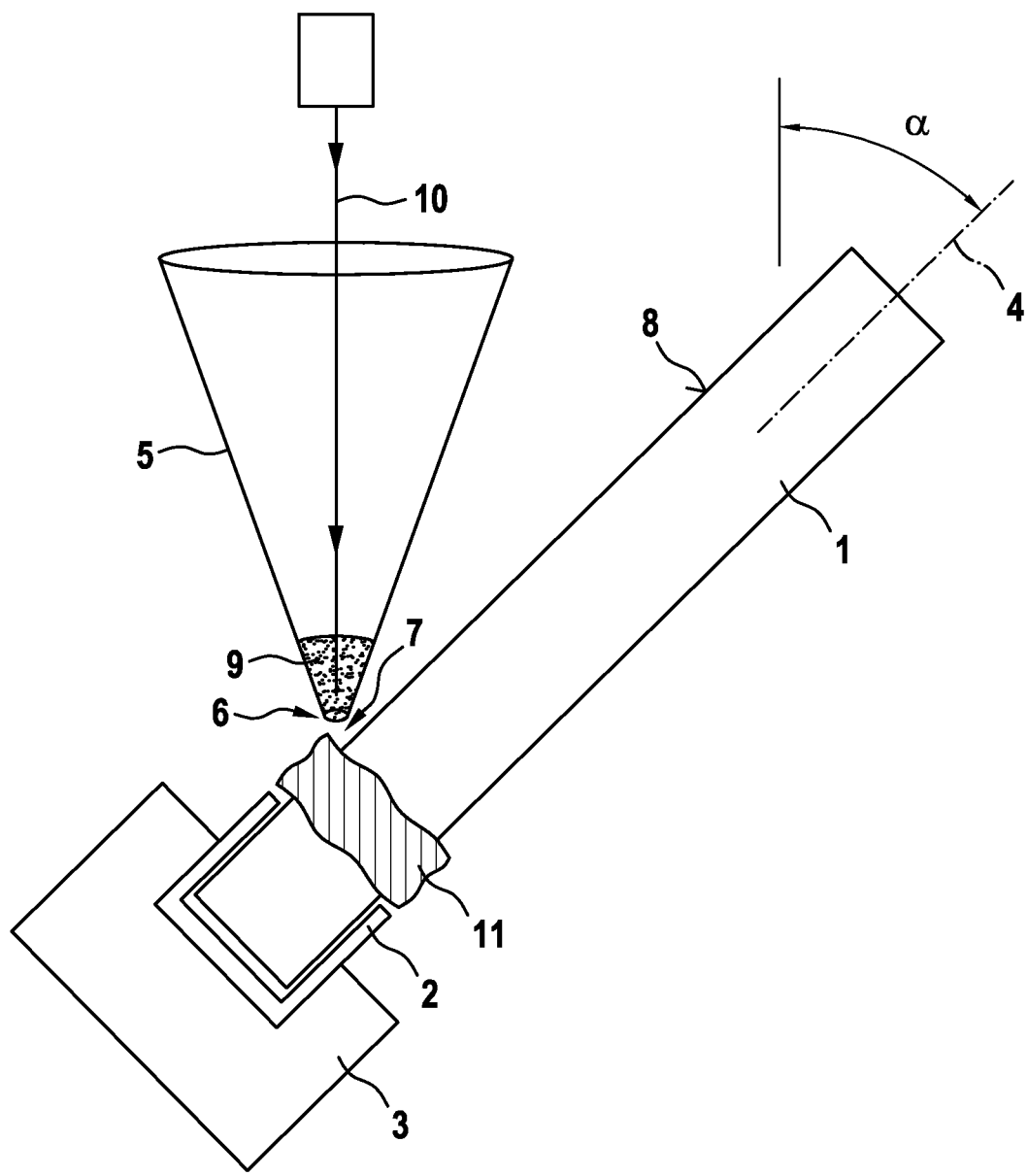

chromatography column by successively adding the solidified amount of casing material (9) at the contact area (7).

7 Claims, 3 Drawing Sheets

(51) Int. Cl.
  *B22F 10/25* (2021.01)
  *B22F 10/28* (2021.01)
  *B33Y 10/00* (2015.01)
  *B33Y 80/00* (2015.01)
  *B22F 10/18* (2021.01)
  *B22F 10/22* (2021.01)

(52) U.S. Cl.
  CPC .............. *B22F 10/28* (2021.01); *B33Y 10/00* (2014.12); *B33Y 80/00* (2014.12); *B22F 10/18* (2021.01); *B22F 10/22* (2021.01)

(58) Field of Classification Search
  CPC ........ B33Y 10/00; B33Y 80/00; B01D 15/22; G01N 30/6052
  See application file for complete search history.

(56) References Cited

OTHER PUBLICATIONS

Fee Conan et al: "3D printed porous media cols. with fine control of column packing morphology", Journal of Chromatography A, Elsevier, Amsterdam, NL, vol. 1333, Jan. 24, 2014 (Jan. 24, 2014), pp. 18-24, XP028660888, ISSN: 0021-9673, DOI: 10.1016/J.CHROMA.2014.01.043.

International Search Report PCT/EP2019/085632 dated Mar. 12, 2020 (pp. 1-4).

Ahuja et al: "Porous Carriers for Controlled/ Modulated Drug Delivery", Indian J. Pharm. Sci., 2009, 71(6), 599-607.

Office Action in corresponding JP Appln. No. 2021-535677 dated Jul. 28, 2023 (pp. 1-2).

METHOD FOR PROVIDING A CASING FOR A CHROMATOGRAPHY COLUMN AND CHROMATOGRAPHY COLUMN

TECHNICAL FIELD

The present invention relates to a method for providing a casing for a prefabricated column of chromatography column material in order to manufacture a chromatography column. The invention also relates to a chromatography column.

BACKGROUND

Chromatography is a laboratory technique that can be used for separating different components of a mixture in order to either analyze the mixture or to be able to make further use of one or all of the components within the mixture. The mixture is dissolved in a fluid called the mobile phase, which carries it through a structure holding a chromatography column material called the stationary phase. Different components of the mixture travel at different speeds along the stationary phase, causing a separation of the different components of the mixture within the chromatography column material of the chromatography column.

Within past decades several different methods for performing a chromatography have been developed. Liquid chromatography with a liquid as mobile phase is usually carried out either in a column or along a plane of a suitable chromatography material that enhances the separation of the components of the mixture within the mobile phase. A chromatography column comprises a chromatography column material like e.g. silica or polymers that is suitable for separation of the components within the fluid of the mobile phase, whereby the chromatography column material is arranged within a casing that confines the mobile phase to the volume that is filled by the chromatography column material. The casing of the chromatography column can be made of glass, plastics or metal. The casing material that is used for enclosing the chromatography column material may depend e.g. on the mobile phase and should reduce any unwanted interaction between the mobile phase and the casing.

Whereas in conventional chromatography the mobile phase moves through the chromatography column without application of external pressure, more advanced chromatography methods like e.g. high-performance liquid chromatography (HPLC) relies on application of external pressure to accelerate the movement of the mobile phase along the chromatography column. However, due to the usually small size of the chromatography column and the rapid movement of the mobile phase along the chromatography column, the analytic results of HPLC significantly depends on the chromatography column that is used for performing the analysis. For example, the volume within the casing should be completely and homogeneously filled with the chromatography column material. Any void space inside of the casing allows for a movement of the mobile phase without any interaction with the chromatography column material, i.e. with the stationary phase, and results in a disturbance and adverse affection of the analytic results.

The length of chromatography columns that are commonly used for HPLC is about 30 mm to 250 mm and the diameter is about 2 to 5 mm. The grain size of the active material within the chromatography column material is about 2 $\mu$m to 50 $\mu$m. The pressure that is applied to the mobile phase is usually between 50 bar and 350 bar. Thus, a suitable casing for the chromatography column material should encompass the chromatography column material without any significant gaps.

Known methods for manufacturing chromatography columns that are suitable for HPLC make use of a prefabricated column of chromatography column material that has been prepared in advance. Usually these columns that are formed out of the chromatography column material are very brittle and fragile. Thus, any undue mechanical load or strain during manufacture of the chromatography column should be avoided.

It is known from prior art to manufacture a hollow pipe metal casing with a diameter that is slightly larger than the diameter of the column of chromatography column material. The brittle column is then inserted into the hollow pipe, and afterwards the hollow pipe is compressed by applying radially inwardly directed pressure onto the hollow pipe.

It is also known from prior art to manufacture a hollow pipe metal casing with dimensions that match the column of the chromatography column material. After heating the hollow pipe expands and the brittle column of chromatography column material can be inserted into the expanded hollow pipe without endangering the brittle column.

However, manufacture of the column of chromatography column material and of the hollow pipe with appropriate dimensions that allow for performing these methods is difficult and expensive. Furthermore, both methods require time and skills to avoid any unwanted damage to the column of chromatography column material during manufacturing of the chromatography column, i.e. during inserting the brittle column into the casing.

Accordingly, there is a need for a method that allows for cost effective production of such chromatography columns. The method should allow for easy manufacture of chromatography columns with casings. The chromatography column with the casing should have none or only a small impact to the analytic results of a chromatography analysis that is performed with the chromatography column.

SUMMARY OF THE INVENTION

The present invention relates to a method wherein the casing is generated by additive manufacturing, including the steps of rotating the column of chromatography column material with respect to a casing material feed in a manner to successively cover a casing surface of the chromatography column material along a contact area path, and of continuously arranging an amount of flowable casing material at a current contact area along the contact area path at the casing surface of the chromatography column material in order to generate the casing for the chromatography column by successively adding the solidified amount of casing material at the contact area. Additive manufacturing allows for the generation of a casing that perfectly matches the shape of the column of chromatography column material without exerting any mechanical load or stress to the brittle column during the additive manufacture of the casing. The casing will be generated step by step and for each step the shape of the casing can be adapted to the shape of the column. By rotating the column of the chromatography column material around a rotation axis, it is possible to add casing material all around the column without any rotational movement of the casing material feed. If a translational movement of the column is superposed to the rotational movement, each portion of the casing surface of the column can be covered with a casing material feed that stays at a predetermined position. Thus, there is no risk of an unwanted collision of any of the mechanical parts required for providing for the casing material feed with the brittle column that is enclosed by the casing. Rotating and translating the brittle column can be performed by using e.g. a three-axis or a five-axis CNC machine.

The flowable casing material can be a powdered casing material comprising small particles of the casing material. The powdered casing material can be heated in order to at least partially melt the powdered casing material. After cooling down again, the powdered casing material will be sintered, preferably pressureless sintered, and provides for a solid and strong casing made out of the powdered casing material. It is also possible to add fluid casing material like e.g. heated and fully molten casing material that solidifies after cooling down again. The solidification of the flowable casing material can be performed by allowing the heated casing material to cool. Many different methods known in prior art seem suitable for heating the flowable casing material before or after the arrangement of the flowable casing material on the contact area. It is also possible to make use of a casing material that must be activated by e.g. illumination with UV light in order to solidify the flowable casing material.

The manufacture process can be started with measuring the size and shape of the column of chromatography column material and with adapting a preset course of the contact area path across the casing surface of the column accordingly. Thus, the shape of the casing that is successively generated matches the shape of the brittle column which reduces any mechanical load or stress that is applied to the brittle column during manufacture of the casing. By consecutively adding and subsequently solidifying only small portions of the casing material, the thermal stress that is applied to the brittle column can be reduced below any threshold that is considered dangerous to the column.

It is also possible to make use of a prefabricated column of chromatography column material with a non-circular cross section. The column might have e.g. a rectangular or polygonal cross section, or an oval or ellipsoidal cross section. With the method according to the present invention, also for such columns with a complex shape a suitable casing can be manufactured in a simple manner and without undue mechanical stress to the column.

According to an aspect of the invention, the column of chromatography column material rotates around a rotating axis that intersects a vertical line at an angle between 0 and 90 degrees, preferably between 45 and 70 degrees. The alignment of the contact area corresponds to the direction of the rotating axis and for most applications will be identical thereto. A small inclination and even more so a zero inclination of the contact area with respect to a horizontal line enhances the chances for the flowable casing material to stay at the contact area until solidification of the casing material at the contact area. A more distinct inclination prevents a possibly undesired accumulation of flowable casing material before solidification of the material, which might result in unwanted variations in the thickness of the casing created by the solidification of the casing material at the contact area. A suitable inclination allows for controlled feeding of a predetermined amount of the flowable casing material from above the rotating column onto the contact area at which the added flowable casing material is solidified. Even in case that some portion of the flowable casing material that is fed to the contact area slides away and falls from the contact area before being solidified and added to the already generated part of the casing, a large amount of flowable casing material will remain at the contact area and can by used for generation of the casing.

According to an embodiment of the present invention, the casing material feed comprises a nozzle for deposition of the flowable casing material onto the contact area. The nozzle can be arranged near to or slightly above the contact area which allows for easy deposition of the flowable casing material onto the contact area. The flowable casing material can be applied onto the contact area by applying pressure and by spraying or blowing the flowable casing material.

According to an advantageous embodiment of the invention, the nozzle is arranged at a vertical line over the contact area of the rotating column of the chromatography column material and in that the flowable casing material falls onto the contact area. The flowable casing material can freely fall down or drop down onto the contact area. By arranging the nozzle directly above the contact area, there is no need to apply external forces in order to direct the flowable casing material onto the contact area. The distance between the nozzle and the contact area can be quite small, e.g. only a few millimeters or less. Thus, the flowable casing material falls with low speed onto the contact area which enhances the chances for staying within the contact area until the flowable casing material is solidified.

According to another aspect of the invention, a laser beam is directed onto the contact area which at least partially melts the flowable casing material, and the molten casing material solidifies after the contact area is no longer illuminated by the laser beam. The laser beam can be a pulsed beam or a continuous beam that illuminates the contact area and induces the energy that is required for melting the casing material in order to perform a sintering process. Preferably, the preset energy deposition of the laser beam is high enough to allow for a homogeneous melting and subsequent solidification of the molten casing material. However, the energy deposition should be as low as possible to avoid undue heating and thermal stress for the column of chromatography column material.

According to an advantageous aspect of the invention, the contact area path along the casing surface is helix-shaped. The helix-shaped contact area path results in a smooth and uniform generation of the casing along the longitudinal axis of the chromatography column. The energy deposition follows the helix-shaped contact area path and revolves around the circumference of the column, thus avoiding prolongated times of energy deposition and corresponding heating of one side of the column that might result in additional thermal stress of the column. It is also possible to predetermine another course of the contact area path along the casing surface like, e.g. segments of straight lines that run parallel to the longitudinal axis of the column and that are placed next to each other around the circumference of the column.

According to yet another advantageous aspect of the invention the contact area path runs more than once along each part of the casing surface resulting in generating a casing with more than one layer of casing material. With each run only a small portion of flowable casing material is arranged onto the corresponding contact area and subsequently solidified. Thus, during each run the mechanical or thermal stress that is applied to the brittle column of chromatography column material is very low. However, by making many runs of the contact area path along each part of the casing surface, each time an additional layer of casing material can be added to the casing which eventually generates a multi-layered thick and strong casing that can withhold large mechanical loads during use of the chromatography column for HPLC.

It is also possible to generate different layers of the casing from different casing materials. For example, it is possible to begin with a thin layer of e.g. a suitable plastic material that is inert with respect to many different fluids and mobile phases, and to continue with one or several layers of a metallic material that encloses the thin layer of inert plastic material and the chromatography column material and provides for mechanical strength and sturdiness.

The invention also relates to a chromatography column with a column of chromatography column material and with a casing around the column of chromatography column material.

According to an aspect of the invention the casing is generated by additive manufacturing. Contrary to prior art methods known to persons skilled in the art, there is no need for mechanical treatment or processing of the casing after inserting the chromatography column material into the casing or the casing around the chromatography column material. Additive manufacturing with e.g. a 3D-printer that is adapted to generating the casing around a brittle column of chromatography column material, does not result in mechanical stress to the column during manufacture and assembling of the column with the casing.

In one preferred embodiment the casing is generated with a method according to the invention at hand as described above. Such a method allows for easy and rapid generation of a casing for brittle or fragile columns of chromatography column material without any undue risk of mechanical or thermal stress to the column.

According to an advantageous embodiment the casing consists of a metallic material. Additive manufacturing of metallic objects is well-known and several methods and materials exist that allow for easy and precise manufacturing of metallic objects. A metallic casing of the chromatography column provides for good protection against mechanical stress. Many metallic materials do not interact with the fluids and solutions that are used for HPLC. If deemed advantageous or necessary, the casing may be made of a suitable plastic material that is inert to most of the mobile phases used for HPLC. It is also possible to generate a casing of metallic material that is coated with an inert plastic material to further reduce any unwanted interaction between the mobile phase and the casing during performance of the HPLC.

The present invention will be more fully understood, and further features will become apparent, when reference is made to the following detailed description and the accompanying drawings. The drawings are merely representative and are not intended to limit the scope of the claims. In fact, those of ordinary skill in the art may appreciate upon reading the following specification and viewing the present drawings that various modifications and variations can be made thereto without deviating from the innovative concepts of the invention. Like parts depicted in the drawings are referred to by the same reference numerals.

Figure 2:
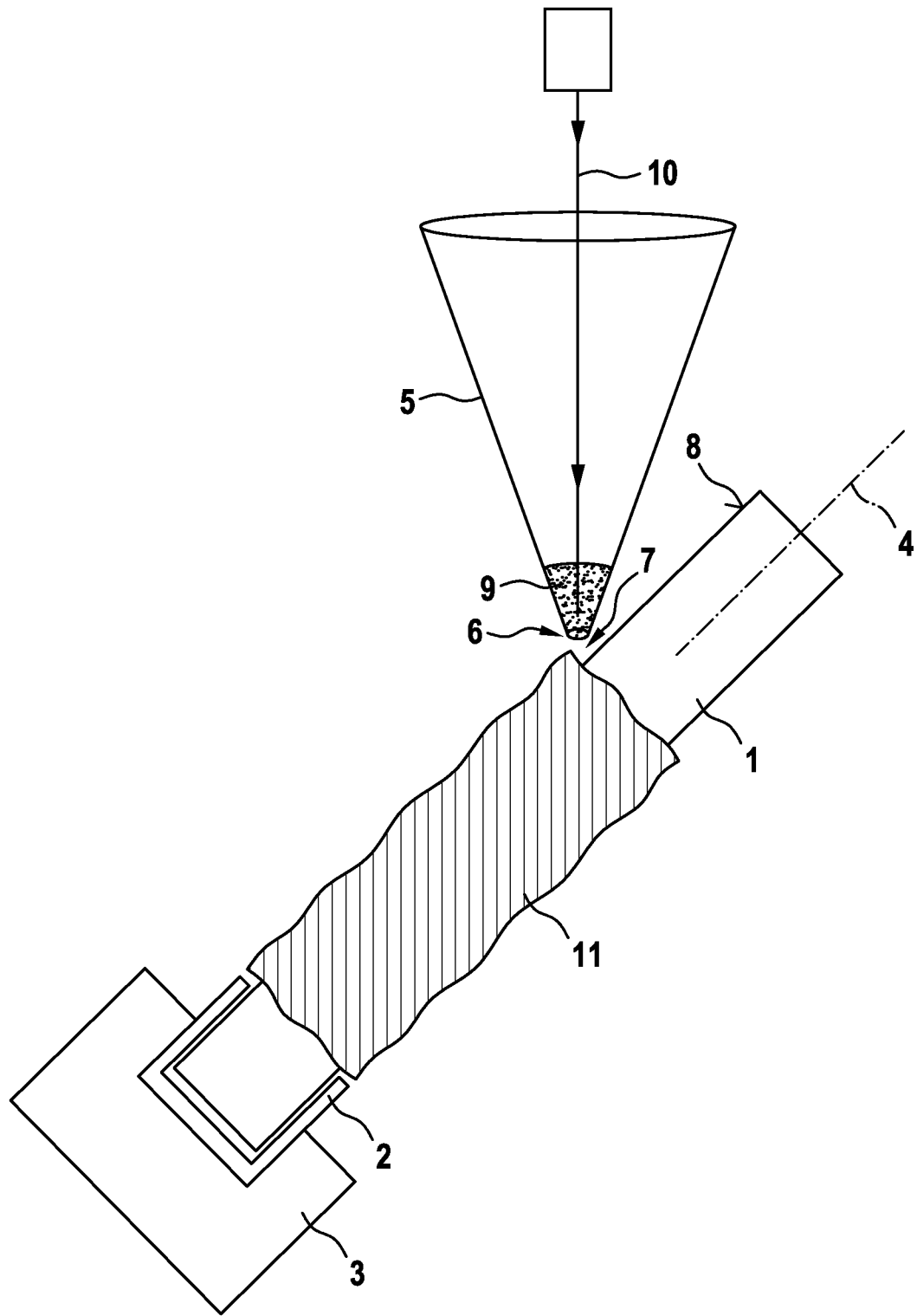
Figure 3:
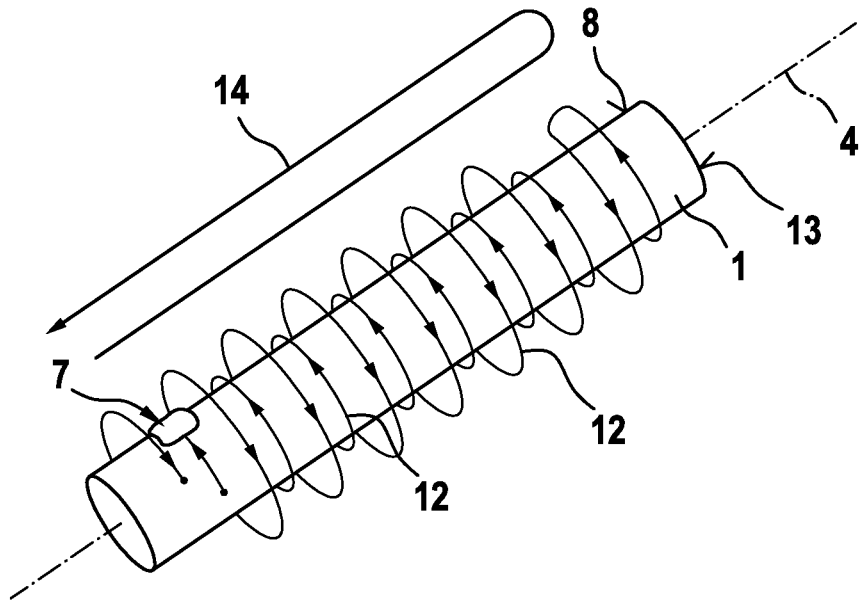
Figure 4:
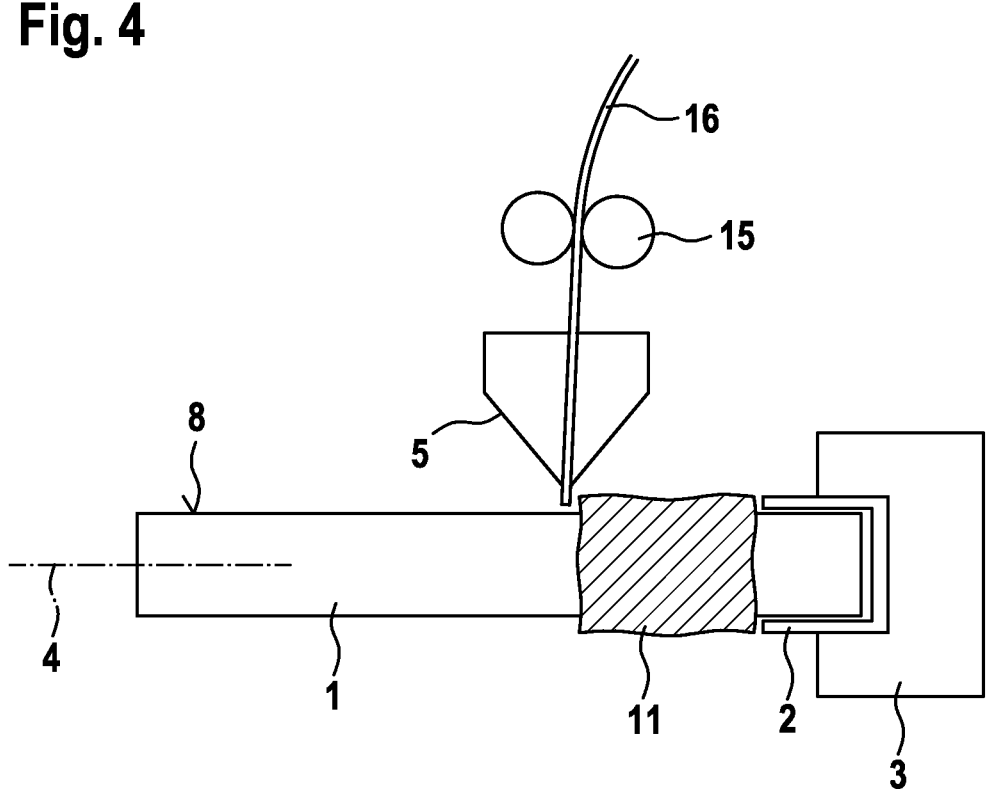

FIG. 1 illustrates a schematic view of a manufacturing step for generating a casing for a column of chromatography column material, whereby only a small part of the casing has been finished, FIG. 2 illustrates a schematic view of the manufacturing step shown in FIG. 1, whereby a larger part of the casing has been finished, FIG. 3 illustrates a schematic view of a contact area path across the casing surface of a column of chromatography column material, and FIG. 4 illustrates a schematic view of another manufacturing step for generating a casing.

DETAILED DESCRIPTION OF THE INVENTION

FIGS. 1 and 2 illustrate a method for additive manufacturing a chromatography column according to the invention described above. A prefabricated small column 1 made of chromatography column material is inserted into a clamping system 2 of a sample holding device 3. The sample holding device 3 is adapted to orient the column 1 toward a preset direction and to rotate the column 1 around a rotating axis that equals a longitudinal axis 4 of the column 1. The longitudinal axis 4 of the column 1 is inclined with respect to a vertical line by an angle $\alpha$ of e.g. 40 degrees.

A nozzle 5 is arranged above the column 1 so that a nozzle outlet 6 is placed directly above a contact area 7 at a lateral surface 8 of the column 1, whereby the lateral surface 8 of the column 1 equals the casing surface that will be covered by a casing. Through the nozzle 5 and the nozzle outlet 6 a small portion of a originally powdered casing material 9 is delivered onto the contact area 7. At the same time or shortly afterwards, a laser beam 10 is directed onto the contact area 7 and causes the powder of the casing material 9 to melt. The molten portion of the casing material 9 adheres to the contact area 7 and solidifies after the laser beam 10 no longer illuminates this contact area 7.

The column 1 slowly rotates and another contact area 7 will be arranged directly under the nozzle outlet 6. The laser beam 10 can be pulsed in order to only illuminate the current contact area 7 at intervals that are required for depositing a molten portion of the casing material 9 onto the current contact area 7. It is also possible to continuously illuminate the contact area 7 that is currently under the nozzle outlet 6 and to continuously rotate the column 1 which brings a new part of the lateral surface 8 of the column 1 as new contact area 7 under the nozzle outlet 6 and into the focus of the laser beam 10.

In addition to the rotation of the column 1 there is superposed a lateral movement of the column 1 with respect to the nozzle 5. The lateral movement can be performed by moving the column 1 along its longitudinal axis 4, or by laterally moving the nozzle 5 along a direction that is parallel to the longitudinal axis 4 of the column 1. Step by step a casing 11 around the column 1 is generated by additive manufacturing. During solidification of the molten casing material 9 the casing material 9 adapts to the shape of the column 1 and the adjacent part of the casing 11 that has been generated so far. Thus, a very homogeneous casing 11 will be generated that perfectly matches the lateral surface 8 of the column 1, resulting in a gap free enclosure of the column 1 that will be generated without undue mechanical or thermal stress to the column 1 of chromatography column material.

It is possible to direct the laser beam 10 through the nozzle 5 and the nozzle outlet 6 in a manner that the powdered casing material 9 melts shortly before it is deposited through the nozzle outlet 6 onto the contact area 7. However, it is also possible to direct the laser beam 10 from outside the nozzle 5 towards the contact area 7. Furthermore, it is also possible to vary the direction of the nozzle 5 with respect to the column 1 or to rotate the nozzle 5 with respect to the column 1 during delivery of the casing material 9 onto the current contact area 7 of the column 1.

In FIG. 1 only a small part of the casing 11 has been generated, whereas FIG. 2 shows the manufacturing step at a later time and thus a larger part of the casing 11 has been generated so far.

In FIG. 3 an exemplary contact area path 12 with a course of the contact area 7 across the lateral surface 8 of the column 1 is schematically illustrated. By superposing a rotational movement around the longitudinal axis 4 of the column and a lateral translation along the longitudinal axis 4 a helix-shaped contact area path 12 will be performed that arranges consecutive spots along the contact area path 12 as current contact area 7 near the nozzle outlet 6. After a layer of the casing 11 is generated and the contact area path 12 reaches an end border of the casing 11 near or at a front face 13 of the column 1, the lateral translation can be reversed, resulting in adding another layer of casing material 9 onto the casing surface. The relative lateral translation of the column 1 with respect to the nozzle 5 is visualized by the arrow 14. Adding a number of layers of casing material 9 may enhance the mechanical stability and pressure resistance of the casing 11.

FIG. 4 depicts another method of delivery of casing material 9 onto the contact area 7 at the column 1. With help of an extruder 15, the casing material 9 is fed e.g. as a filament 16 into a heated nozzle 5 which melts the filament 16 and deposits a portion of the molten casing material 9 onto the contact area 7 at the lateral surface 8 of the column 1. It is also possible to feed already molten extruded casing material 9 from the extruder 15 to the nozzle 5 and to apply the extruded casing material 9 onto the contact area 7.

The invention claimed is:

1. A method for providing a casing (11) for a prefabricated column (1) of chromatography column material in order to manufacture a chromatography column, wherein the casing (11) is generated by additive manufacturing, including the steps of rotating the column (1) of chromatography column material with respect to a casing material feed in a manner to successively cover a casing surface (8) of the chromatography column material along a contact area path (12), and of arranging an amount of flowable casing material (9) at a current contact area (7) along the contact area path (12) at the casing surface (8) of the column (1) of chromatography column material in order to generate the casing (11) for the chromatography column by successively adding the solidified amount of casing material (9) at the contact area (7).

2. The method of claim 1, characterized in that the column (1) of chromatography column material rotates around a rotating axis that intersects a vertical line at an angle between 0 and 90 degrees, preferably between 45 and 70 degrees.

3. The method of claim 1, characterized in that the casing material feed comprises a nozzle (5) for deposition of the flowable casing material (9) onto the contact area (7).

4. The method of claim 3, characterized in that the nozzle (5) is arranged at a vertical line over the contact area (7) of the rotating column (2) of the chromatography column material and in that the flowable casing material (9) falls onto the contact area (7).

5. The method of claim 1, characterized in that a laser beam (10) is directed onto the contact area (7) which at least partially melts the flowable casing material (9), and in that the molten casing material (9) solidifies after the contact area (7) is no longer illuminated by the laser beam (10).

6. The method of claim 1, characterized in that the contact area path (12) along the casing surface (8) is helix-shaped.

7. The method of claim 1, characterized in that the contact area path (12) runs more than once along each part of the casing surface (8) resulting in generating a casing (11) with more than one layer of casing material (9).

* * * * *